June 25, 1940. F. W. M. SCHNEIDER 2,205,496
ORNAMENT AND LAMP SUPPORT FOR USE ON CHRISTMAS TREES, ETC
Filed Aug. 15, 1938
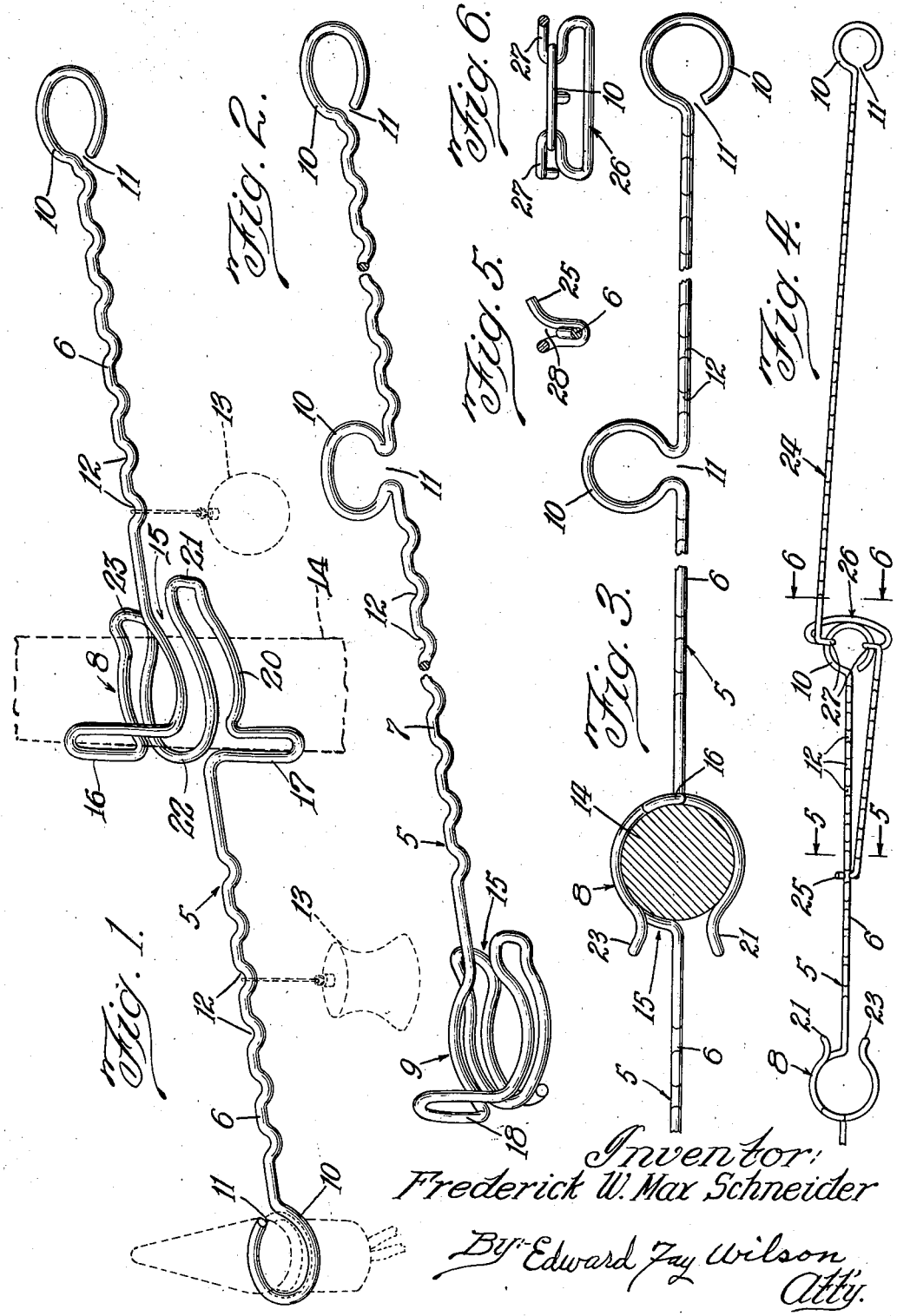
Inventor:
Frederick W. Max Schneider
By: Edward Jay Wilson
Atty.

Patented June 25, 1940

2,205,496

UNITED STATES PATENT OFFICE 2,205,496

ORNAMENT AND LAMP SUPPORT FOR USE ON CHRISTMAS TREES, ETC.

Frederick W. Max Schneider, Chicago, Ill.

Application August 15, 1938, Serial No. 224,855

3 Claims. (Cl. 248—229)

This invention relates to improved means for hanging ornaments and lamps on Christmas trees or other similar supports.

The object of the invention is to provide an ornament and lamp support of very simple construction; which is so made that it can be readily sprung into place on, or removed from, the central stem of a Christmas tree; which shall clasp the tree with sufficient pressure to remain firmly in place; and which will provide one or two horizontal arms projecting out from the stem upon which ornaments and lamps can be supported.

A special feature of the invention is that the device is preferably made of a single piece of wire and is bent to provide the several features mentioned.

A valuable feature of the invention consists of a member adapted to be secured rigidly to an arm of the support and extend its operative length. Such extension members are especially useful in placing lamps near the outer ends of the branches when the regular supports available are too short for this effect.

The invention will be more readily understood by reference to the accompanying drawing forming part of this specification and illustrating two forms of the invention.

In said drawing:

Fig. 1 is a perspective view of a two-armed form of the device;

Fig. 2 is a similar view of a modified construction of a single arm form;

Fig. 3 is a top plan view of a two-armed form of the device shown in Fig. 2;

Fig. 4 is a fragmentary, plan view of a modified construction showing an extension member secured to the main arm; and Figs. 5 and 6 are detail cross-sections on the lines 5—5 and 6—6 respectively of Fig. 4.

As has been explained, the invention is preferably embodied in a wire support 5 which may have two arms 6 as shown in Fig. 1, or only one arm 7, as shown in Fig. 2.

The device as shown is formed up out of wire to provide a hub part 8, Fig. 1, or a somewhat similar hub part 9 as shown in Fig. 2. The supporting arms 6 and 7, are provided with loops 10 to receive and hold upright the usual Christmas tree electric lamps.

The loops 10 are each provided with an opening 11 through which the wires connecting with the lamp socket can be passed in placing the sockets on the wire supports.

Each arm 6 and 7, is bent to form corrugations 12 in which the wires or strings which carry ornaments 13, will be held against accidental movement on the wire support and so that the ornaments can be readily spaced from each other as desired. These corrugations 12 in the arms, also serve to stiffen the arms vertically.

It is obvious that the arms 6 and 7 may be made longer or shorter and provided with one or more of the lamp supporting loops 10. The wire of which the device is formed, is bendable but has some resiliency so that when the hubs 8 or 9 are formed they can be readily pushed or snapped upon the supporting stem 14 as indicated in dotted lines in Fig. 1.

A particular feature relates to the structure of the hubs by which the single wire is formed to provide the hubs with an open side or mouth as shown at 15 with bracing parts as shown in Fig. 1 at 16 and 17, and in Fig. 2 at 18.

In forming the hub 8, if we start with the left hand arm 6, the wire is bent down and up again to form the brace 17, then it extends on about half way round the stem as shown at 20 and is doubled back on itself to form one side 21 of the mouth 15 and extends back around to the other side as shown at 22 and is there bent back upon itself as shown at 23 to form the other side of the mouth 15. It is then formed back nearly half of the circumference and is bent up and then down again to form the upper brace 16 and is then bent out to form the opposite ornament supporting arm.

The upper brace 16 holds the device in position against the down pull of the right hand arm and the lower brace 17 holds the device in position against the down pull of the left hand arm, Fig. 1.

The hubs being resilient and the wire bendable, it is obvious that the hubs can be formed by hand to tightly clasp stems of different diameters, that is, within certain limits. It is further obvious that the hubs can be made of varying diameters—some larger and some smaller, to fit on the usual tapering stems of Christmas trees.

The hub 9, shown in Fig. 2, is quite similar to that shown in Fig. 1, except that as it has but a single arm, the hub is formed with but one bracing projection 18 and opposed to the single arm. It is formed to provide the resilient clasping arms and has the opening 15 at one side.

In Figs. 4, 5 and 6, I have illustrated an extension member which is adapted to extend the supporting arm outwardly in order to place lamps nearer the outer ends of the branches than the regular form of support available, would place them.

I have shown a regular support device 5 in Fig. 4, having a resilient hub 8 and a lamp socket ring 10 at the outer end of the arm.

In said Fig. 4, I have shown an arm extension member 24 having a lamp socket loop 10 at its outer end and a hook 25 at its inner end for clasping the arm 5 and adapted to be forced into engagement with the arm 5 from beneath. Between its ends the extension member is formed as shown at 26, to engage the loop 10 at the outer end of the arm 5. This formation 26 includes two opposed hook-like bends 27 adapted to receive the ring 10 and in combination with the hook 25 hold the extension member rigidly in horizontal position.

The hook 25, as best shown in Fig. 5, has a mouth 28 which is narrower than the thickness of the wire of the main arm so that when once forced into clasping position, it will not be inadvertently loosened therefrom.

Besides being used in ornamenting Christmas trees, the supporting arms, especially those with only one arm, can be arranged projecting horizontally from a vertical support such as a straight pole or bar and used to ornament a store window with various combinations of lengths of arms.

As many modifications of the invention will readily suggest themselves to one skilled in the art, I do not limit or confine the invention to the specific constructions shown and described except within the scope of the appended claims.

I claim:

1. In a device of the character described, a single piece of wire bent back and forth upon itself to form substantially semi-circular resilient clasping arms and longitudinal oppositely extending brace parts, the ends of the clasping arms being adapted to be separated to permit said arms to be forced upon and clasp a Christmas tree stem or similar support, with the brace parts in contact with the support above and below the clasping arms.

2. In a device of the character described, made of a single piece of wire, a resilient hub member provided with an horizontally extending support, the hub member being formed by bending the wire back and forth upon itself to form a substantially circular loop open at one end to provide substantially semi-circular clasping arms, the ends of the arms adjacent the opening in said loop being extended and bent into longitudinally extending brace parts, the ends of the clasping arms being adapted to be separated to permit the hub member to be forced upon and clasp a Christmas tree stem or similar support, with the brace parts engaging the support.

3. In a device of the character described, made of a single piece of wire, a resilient hub member comprising a substantially circular open-sided loop the sides of which are substantially semi-circular clasping arms, the free ends of one of said arms being bent back upon themselves in substantial parallelism with the arm and being extended and bent into substantially U-shaped longitudinally extending brace arms adjacent the closed side of the loop, the free end of a brace arm being bent into a substantially horizontally extending supporting arm, the hub member being adapted to be forced upon and clasp a Christmas tree stem or similar support with the brace arms engaging said support.

FREDERICK W. MAX SCHNEIDER.